(12) United States Patent
Narisi

(10) Patent No.: US 7,278,058 B1
(45) Date of Patent: Oct. 2, 2007

(54) METHODS AND APPARATUS TO DIAGNOSE SOFTWARE

(75) Inventor: Anthony Narisi, Glenmoore, PA (US)

(73) Assignee: Unisys Corporation, Blue Bell, PA (US)

( * ) Notice: Subject to any disclaimer, the term of this patent is extended or adjusted under 35 U.S.C. 154(b) by 471 days.

(21) Appl. No.: 10/925,419

(22) Filed: Aug. 25, 2004

(51) Int. Cl.
*G06F 11/00* (2006.01)

(52) U.S. Cl. ........................................ 714/38
(58) Field of Classification Search ................ 714/38
See application file for complete search history.

(56) References Cited

U.S. PATENT DOCUMENTS

| | | | | |
|---|---|---|---|---|
| 5,944,841 | A * | 8/1999 | Christie ........................ | 714/38 |
| 6,539,339 | B1 * | 3/2003 | Berry et al. ................. | 702/186 |
| 6,553,564 | B1 * | 4/2003 | Alexander et al. .......... | 717/128 |
| 6,732,307 | B1 * | 5/2004 | Edwards ...................... | 714/724 |
| 7,017,084 | B2 * | 3/2006 | Ng et al. ....................... | 714/45 |
| 7,055,070 | B1 * | 5/2006 | Uhler et al. .................. | 714/45 |
| 2001/0014941 | A1 * | 8/2001 | Akkary et al. .............. | 712/228 |
| 2002/0162055 | A1 * | 10/2002 | Kurooka et al. ............. | 714/45 |
| 2003/0005266 | A1 * | 1/2003 | Akkary et al. .............. | 712/220 |
| 2003/0145255 | A1 * | 7/2003 | Harty et al. .................. | 714/48 |
| 2004/0025144 | A1 * | 2/2004 | Yang ........................... | 717/128 |
| 2004/0030962 | A1 * | 2/2004 | Swaine et al. ................ | 714/45 |
| 2005/0034012 | A1 * | 2/2005 | Bartlett et al. ................ | 714/5 |

* cited by examiner

*Primary Examiner*—Robert Beausoliel
*Assistant Examiner*—Amine Riad
(74) *Attorney, Agent, or Firm*—Richard J. Gregson; RatnerPrestia

(57) ABSTRACT

Methods and apparatus to diagnose software including diagnostic gathering instructions are disclosed. The software is diagnosed by storing diagnostic information to a plurality of individual trace buffers responsive to the diagnostic gathering instructions, consolidating the diagnostic information from the plurality of individual trace buffers to a consolidated trace buffer, and presenting at least a portion of the consolidated diagnostic information.

20 Claims, 4 Drawing Sheets

112

| | |
|---|---|
| ITB_Count | ~402 |
| Individual trace Buffer (ITB) #1 | ~404a |
| ITB_Strings #1 | ~406a |
| Individual trace Buffer (ITB) #2 | ~404b |
| ITB_Strings #2 | ~406b |
| ... | |
| Individual trace Buffer (ITB) #n | ~404n |
| ITB_Strings #n | ~406n |

FIG. 4

METHODS AND APPARATUS TO DIAGNOSE SOFTWARE

FIELD OF THE INVENTION

The present invention relates to the field of software development and, more particularly, to software diagnostic methods and apparatus.

BACKGROUND OF THE INVENTION

Present society is heavily reliant on computer software (referred to herein as "software"). The software is often complex with portions of a single piece of software performed by several different processors, e.g., in a symmetric multi-processing (SMP) environment. Due to this complexity and heavy reliance, methods and apparatus for verifying the proper execution of software are useful.

"Tracing" is a common mechanism for verifying proper execution of software. In this mechanism, instructions are inserted into the software to store specified diagnostic information into a common buffer during execution of the software. In software for which execution speed is critical, there is a conflict between gathering diagnostic information and execution speed because each instruction to gather diagnostic information adversely affects the execution speed of the software.

This conflict is even more significant in software designed to operate in a multi-processor environment such as an SMP environment because exclusive access to the common buffer is required to make an entry into the common buffer. For example, if one processor is making an entry to the common buffer all other processors in the SMP environment executing an instruction to make an entry to the common buffer remain idle until the current processor releases the common buffer for access by a subsequent processor.

To address the conflict between gathering diagnostic information and execution speed, instructions inserted for gathering diagnostic information are present during the development of software and then may be bypassed or deleted when the software is put into actual use. Accordingly, diagnostic information beneficial to the development of the software is unavailable for diagnosis during actual use.

It is often desirable to diagnose software after development. Accordingly, improved methods and apparatus for gathering diagnostic information that are not subject to the above limitations are needed. The present invention addresses this need among others.

SUMMARY OF THE INVENTION

The present invention is embodied in methods and apparatus to diagnose software including diagnostic gathering instructions. The software is diagnosed by storing diagnostic information to a plurality of individual trace buffers responsive to the diagnostic gathering instructions, consolidating the diagnostic information from the plurality of individual trace buffers to a consolidated trace buffer, and presenting at least a portion of the consolidated diagnostic information.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Included in the drawings are the following figures:

FIG. 4 is a block diagram of an exemplary consolidated trace buffer in accordance with the present invention.

DETAILED DESCRIPTION OF THE INVENTION

Figure 1:
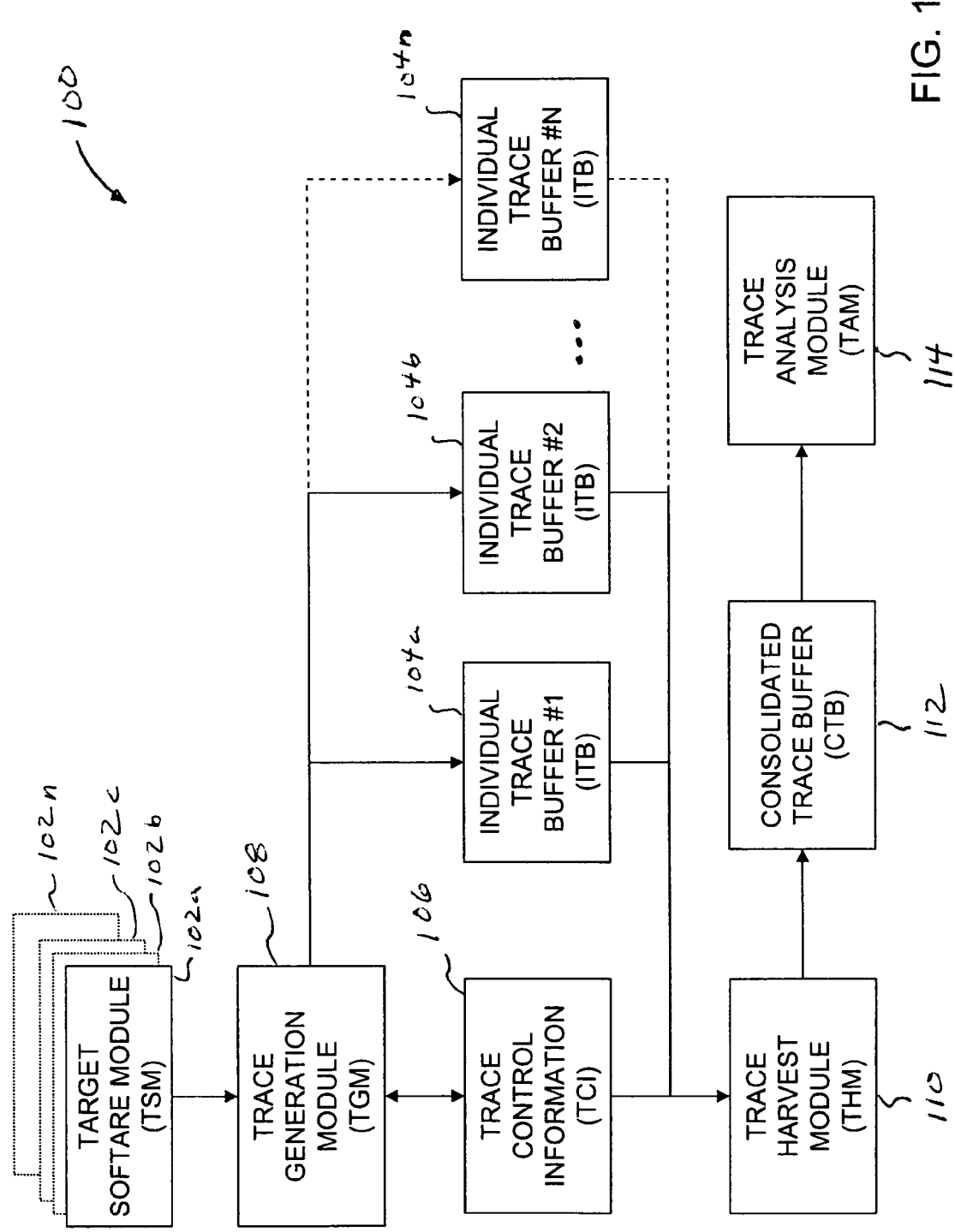
FIG. 1 is a block diagram of an exemplary software diagnostic architecture in accordance with the present invention.

FIG. 1 depicts an exemplary software diagnostic architecture 100 to diagnose one or more target software modules (represented by target software modules "TSMs" 102a-n) in accordance with the present invention. Functions of one or more blocks within the illustrated architecture 100 can be performed by the same piece of hardware or module of software. It should be understood that embodiments of the present invention may be implemented in hardware, software, or a combination thereof. In such embodiments, the various component and steps described below may be implemented in hardware and/or software.

The TSMs 102 are modules of software for which diagnostic information is desired. The TSMs 102 include diagnostic gathering instructions, which are discussed in further detail below, specifying the diagnostic information to gather while the TSMs 102 are running. In an exemplary embodiment, the TSMs 102 further include one or more instructions for initiating a software diagnostic initialization routine. The TSMs 102 may include, by way of non-limiting example, software associated with a multi-threaded kernel-mode device driver (referred to herein as a "multi-threaded driver") and software associated with a multi-threaded user-mode application (referred to herein as a "multi-threaded application"). The multi-threaded driver may be a driver such as a low level LAN control software module and the multi-threaded applications may be a consumer application such as a word processor. Other suitable TSMs will be readily apparent to those of skill in the art from the description herein.

The gathered diagnostic information is selectively stored in a plurality of individual trace buffers (represented by individual trace buffers "ITBs" 104a-n). In an exemplary embodiment, the diagnostic information is passed to a particular ITB 104 based on the threads of the TSM 102 (e.g., for a multi-threaded application implementation) or on a device/processor processing the TSM 102 (e.g., for a multi-threaded device implementation).

Figure 2:
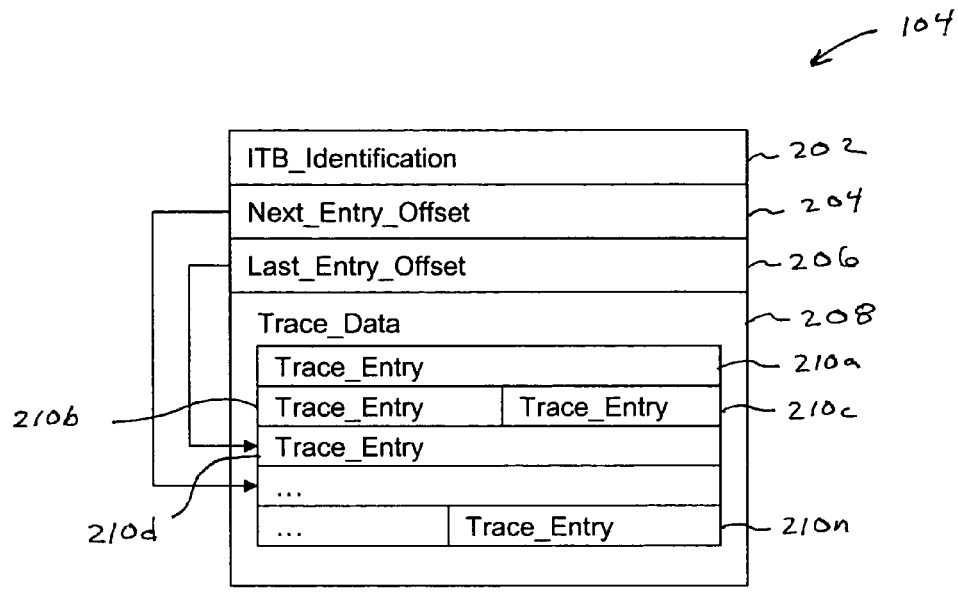
FIG. 2 is a block diagram of an exemplary individual trace buffer data structure in accordance with the present invention.

FIG. 2 depicts an exemplary structure of an individual trace buffer 104. The exemplary structure includes the following components: ITB_Identification 202, Next_Entry_Offset 204, Last_Entry_Offset 206, and Trace_Data 208. The ITB_Identification component 202 includes an identifier that uniquely identifies the particular source supplying diagnostic information to the ITB 104. For example, if the ITB corresponds to a particular thread, the ITB_Identification component 202 identifies the particular thread.

The Trace_Data component 208 stores diagnostic information from the TSM(s) 102. In an exemplary embodiment, the Trace_Data component 208 references a "circular" buffer containing a set of variable length trace entries (represented by Trace_Entry(s) 210*a-n*). A Trace_Entry 210 within the Trace_Data component 208 is not allowed to wrap around the end of the Trace_Data component 208. To facilitate alignment, the size of each Trace_Entry 210 may be rounded up to a multiple of 4 bytes in a 32-bit environment and 8 bytes in a 64-bit environment. The Next_Entry_Offset component 204 identifies an offset within the Trace_Data component 208 for the next Trace_Entry 210 to allocate and the Last_Entry_Offset component 206 identifies an offset within the Trace_Data component 208 of the last Trace_Entry 210 allocated.

Figure 3:
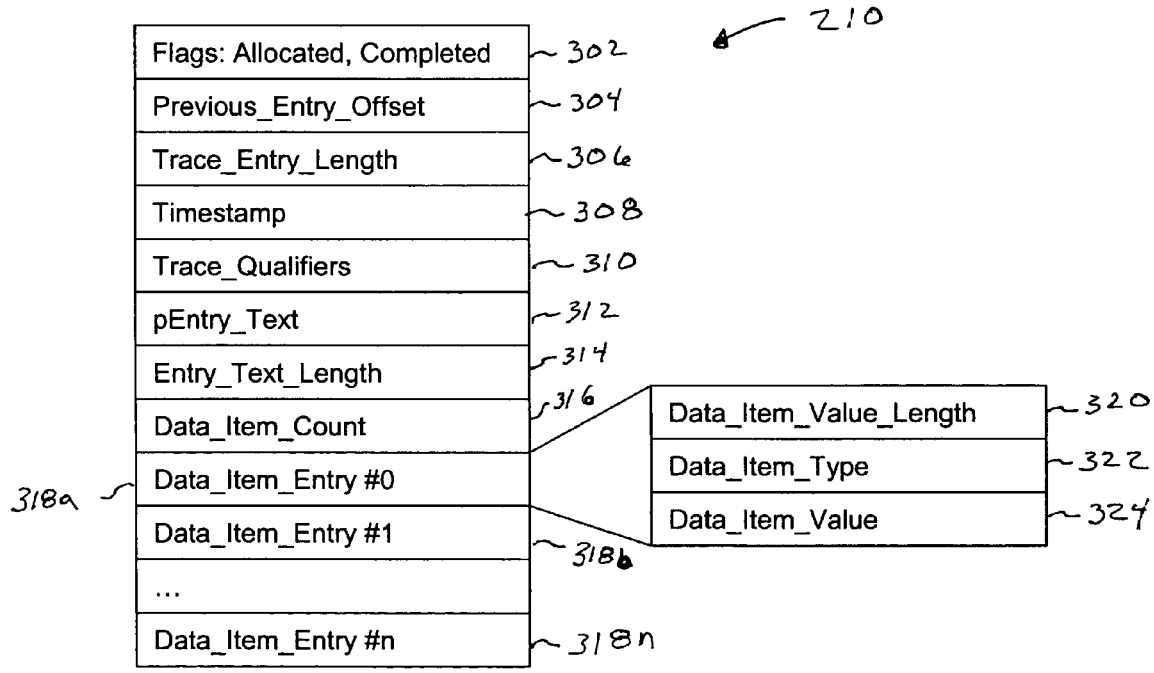
FIG. 3 is a block diagram of an exemplary trace entry data structure in accordance with the present invention.

FIG. 3 depicts an exemplary structure for a Trace_Entry 210. The exemplary structure includes the following components: Flags 302, Previous_Entry_Offset 304, Trace_Entry_Length 306, Timestamp 308, Trace_Qualifiers 310, pEntry_Text 312, Entry_Text_Length 314, Data_Item_Count 316, and one or more data item entries (represented by Data_Item_Entry(s) 318*a-n*).

The Flag components 302 include an Allocated_Flag and a Completed_Flag. The Allocated_Flag indicates that the Trace_Entry 210 is allocated and is used to determine an end of trace buffer condition. If the Allocated_Flag is not set, only the Previous_Entry_Offset component 304 contains valid information. The Completed_Flag indicates that the Trace_Entry 210 is complete and is used during gathering and analysis of diagnostic information to determine if a Trace_Entry 210 can be processed. If the Completed_Flag is set to off, only the Trace_Entry_Length component 306 and the Previous_Entry_Offset component 304 contain valid information.

The Previous_Entry_Offset component 304 is an offset (e.g., in bytes) within the Trace_Data component 208 of the Trace_Entry 210 allocated prior to the present Trace_Entry 210. The Previous_Entry_Offset component 304 is used to scan through the Trace_Entry(s) (e.g., starting from the most recently allocated and working backwards). The Trace_Entry_Length component 306 is the length (e.g., in bytes) of the Trace_Entry 210. The Timestamp component 308 is a timestamp of when the Trace_Entry 210 is allocated, which is used to correlate Trace_Entry(s) from different ITBs 104.

The Trace_Qualifiers component 310 is a tuple that allows a Trace_Entry 210 to be qualified with information useful for analysis, i.e., to search for a specific qualifier value or filter entries by qualifier values. In an exemplary embodiment, each Trace_Entry 210 is qualified with an enumeration indicating the type of occurrence (e.g., Normal, User Error, Internal Error, etc.). The pEntry_Text component 312 is a memory address of a tuple of constant valued, variable-length, null-terminated text strings, of which the first string summarizes what the Trace_Entry 210 indicates and the remaining strings describe each Data_Item_Entry 318 in the Trace_Entry 210. The Entry_Text_Length component 314 includes the length of the text strings.

The Data_Item_Count component 316 includes the number of data item entries (represented by Data_Item_Entry(s) 318*a-n*) in the Trace_Entry 210. Each Trace_Entry includes an array of zero or more Data_Item_Entry(s) 318. Each Data_Item_Entry 318 includes the following components: a Data_Item_Value_Length 320, a Data_Item_Type 322, and a Data_Item_Value 324. The Data_Item_Value_Length component 320 includes an actual length of the Data_Item_Value component 324. The Data_Item_Type component 322 identifies the data type of the Data_Item_Entry(s) 318, e.g., numeric, text, or a more complex structure type. The Data_Item_Value component 324 is a variable length data item value that may be rounded to a multiple of 4 bytes on a 32-bit platform and 8 bytes on a 64-bit platform. Rounding the Data_Item_Value component 324 has the added benefit of aligning the Trace_Entry(s) 210.

Referring back to FIG. 1, trace control information (TCI) 106 is a data structure that stores information about each ITB 104. In an exemplary embodiment, the TCI 106 includes all information needed to describe each ITB 104, including the location of each ITB. In an alternative exemplary embodiment, the TCI 106, in combination with the ITBs, include all information needed to describe each ITB 104.

In an exemplary embodiment, the TCI 106 includes the following components: an ITB_Count, a Trace_Data_Length, and a Trace_Buffer_Ptrs. The ITB_Count indicates the total number of ITBs. In an exemplary embodiment, the Trace_Data_Length component specifies the length (e.g., in bytes) of the Trace_Data component for the ITBs 104. In an alternative exemplary embodiment, the Trace_Data_Length may be incorporated into the ITB 104 to allow each ITB 104 to have an independent trace data length. In an exemplary embodiment, the Trace_Buffer_Ptrs component is an array of pointers to each ITB 104. In an alternative exemplary embodiment, a linked list of ITBs is maintained by the TCI 106.

For a multi-threaded driver exemplary implementation, there are N plus M Trace_Buffer_Ptrs array elements (i.e., for N plus M ITBs 104), where N is the number of processors and M in the number of devices. In an exemplary embodiment, the first N entries of Trace_Buffer_Ptrs array correspond to "processor ITBs" and the remaining entries correspond to "device ITBs," i.e., Trace_Buffer_Ptrs entry N+X corresponds to device ITB X. For a multi-threaded application exemplary implementation, there are Y Trace_Buffer_Ptrs array elements (i.e., for Y ITBs 104), where Y is the number of threads the TSM may initiate.

A trace generation module (TGM) 108 interfaces with the TSM(s) 102. The TGM 108 stores diagnostic information from the TSM(s) 102 into the ITBs 104. In an exemplary embodiment, the TGM 108 includes functions that are called by diagnostic gathering instructions inserted into the TSM 102 to store diagnostic information. The TGM 108 maintains internal data structures used to store all diagnostic information in the ITBs 104.

In an exemplary embodiment, the TGM 108 passes data to the ITBs 104 based on the specified TSM 102 and the execution environment. For example, for a multi-threaded driver TSM, an ITB is allocated for each system processor and for each "instance" of an interrupt handler, i.e., for each device managed by the driver. This organization of the ITBs 104 allows entry of diagnostic information into the ITBs without explicit locking. In addition, use of memory caches associated with the ITBs are maximized by this organization because each processor has a corresponding ITB 104 for non-interrupt level processing. This is also true for interrupt ITBs because each interrupt handler instance is affinitized to a specific processor.

In an exemplary embodiment for a multi-threaded application, an ITB is allocated for each thread of the application. Thus, each thread has exclusive access to a unique ITB, which allows entry of diagnostic information into the ITBs without explicit locking. If the threads are processor affinitized, the processor cache is also optimized.

The illustrated trace harvest module 110 is coupled to the ITBs 104, the TCI 106, and to a consolidated trace buffer (CTB) 112. The trace harvest module "harvests" (i.e., gathers) the ITBs 104 and places the ITBs 104 in the CTB 112.

FIG. 4 depicts the structure of an exemplary CTB 112. The illustrated CTB 112 includes the following components: ITB_Count 402, the harvested content of the ITBs 104 (represented by ITB(s) 404a-n), and the text strings reference by the ITB (represented by ITB_String(s) 406a-n). The ITB_Count component 402 indicates how many times the ITB/ITB_String components 404/406 are repeated. In an exemplary embodiment, the ITBs 404 stored within the CTB 112 are copies of the "in-memory" ITBs 104 harvested by the THM 110. The ITB_String components 406 contain all text strings referenced by a corresponding ITB 404. For an in-memory ITB 104, the Trace_Entry component 210 and pEntry_Text components 312 point to these strings. Within the ITB_string components 406, the string values are stored in the order they are referenced by the Trace_Entry(s) 210 of the ITB 104 (e.g., from the most recently allocated Trace_Entry backwards). In an exemplary embodiment, the CTB 112 is stored as a disk file.

Referring back to FIG. 1, the THM 110 harvests diagnostic information from the ITBs 104, for example, in a "post-mortem" analysis (e.g., from a dump file), on manual initiation (e.g., when improper behavior is observed), and/or upon initiation by software (e.g., when inconsistent conditions are detected).

A different implementation of the THM 110 may be present for each method of harvesting diagnostic information. For example, one implementation may be present to harvest diagnostic information during execution of the TSM 102 and another implementation may be present for harvesting diagnostic information from dump files. In an exemplary embodiment, all implementations of the THM 110 are transparent to a trace analysis module (TAM) 114.

The TAM 114 processes raw diagnostic information from the CTB 112 for presentation. In an exemplary embodiment, the TAM 114 includes functionality for searching through available diagnostic information for specific occurrences of data values, filtering and/or sorting information to focus on specific types of information, and/or analyzing elapsed time measurements.

Figure 5:
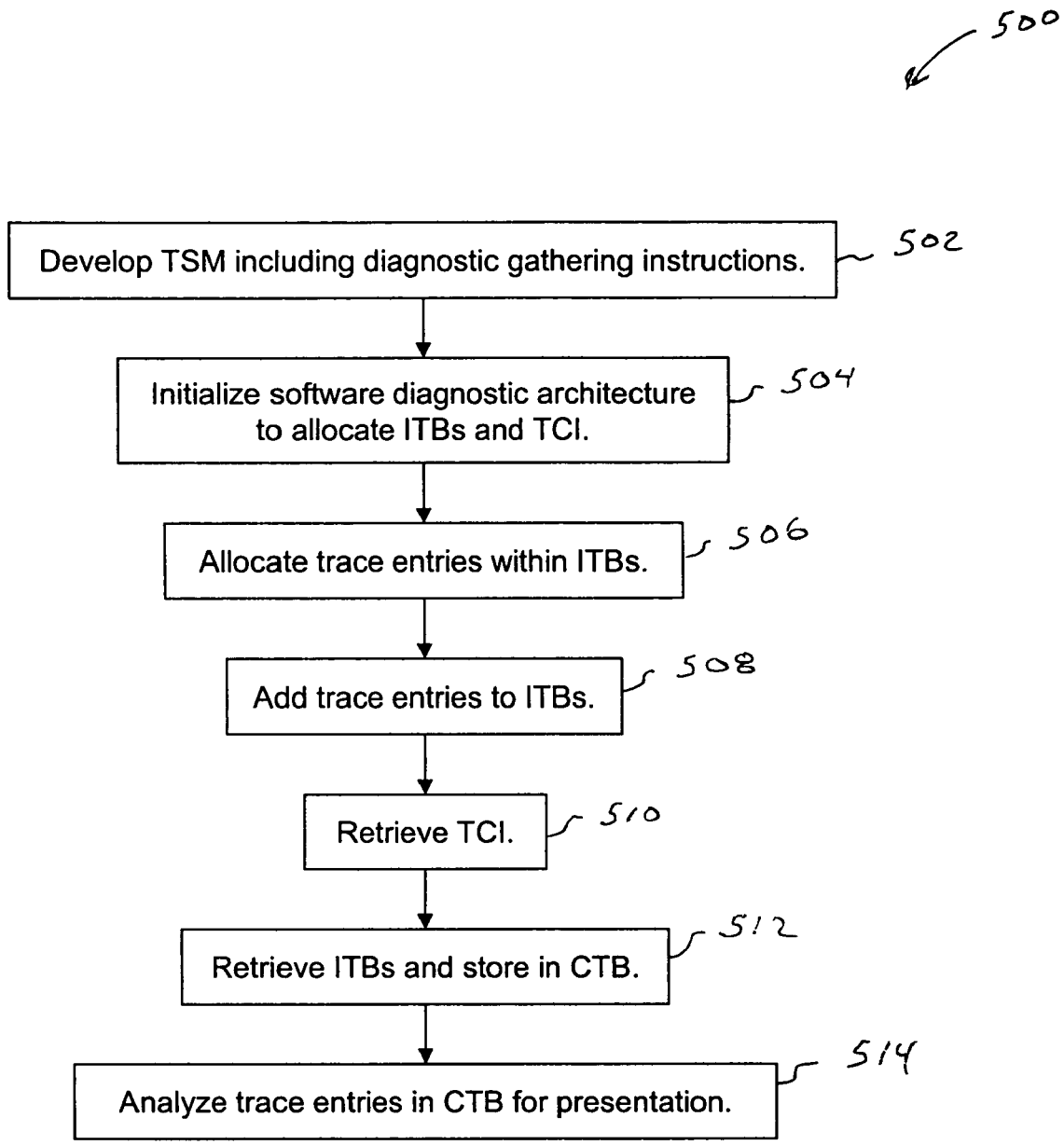
FIG. 5 is a flow chart of exemplary steps for gathering and presenting diagnostic information in accordance with the present invention.

FIG. 5 depicts a flow chart 500 of exemplary steps for gathering and presenting diagnostic information. The exemplary steps are described with reference to the software diagnostic architecture 100 of FIG. 1. At block 502, the TSM 102 is developed. In an exemplary embodiment, a computer software programmer adds initialization instructions and diagnostic gathering instructions, which are described in greater detail below, to the TSM 102 during its development.

At block 504, the software diagnostic architecture 100 is initialized. In an exemplary embodiment, the TGM 108 performs an initialization function (referred to herein as "Trace_Initialization"), which may be called by the TSM 102, to initialize the software diagnostic architecture. In an exemplary embodiment, the number of ITBs is determined and allocated during the initialization of the software diagnostic architecture 100. Additionally, the TCI 106 describing the ITBs is allocated during the initialization of the software diagnostic architecture 100. The ITBs 104 and TCI 106 may be dynamically allocated/updated as needed during "run time" in addition to or instead of during the initialization of the software diagnostic architecture.

For a multi-threaded application, the number of ITBs may be specified in an initialization statement within the TSM 102. For a multi-threaded device exemplary implementation, the number of ITBs may be determined during initialization through calls to the operating system. For example, the Trace_Initialization function may execute a call on the operating system to determine the number of processors. In addition, the Trace_Initialization function may execute a call on the operating system to determine the number of devices (or interrupts). The number of processors and the number of devices (or interrupts) may then be combined to determine the number of ITBs 104. Alternatively, the programmer may indicate the number of ITBs during development of the TSM 102 for the multi-threaded device.

At block 506, trace entries (i.e., Trace_Entry) are allocated from the appropriate ITB 104. In an exemplary embodiment, the TGM 108 executes a trace entry allocation function (referred to herein as Trace_Allocate_Entry) to allocate trace entries from the appropriate ITB. Trace_Allocate_Entry may be called by the TSM 102 or the TGM 108 and returns a pointer to the allocated Trace_Entry to the caller.

Input arguments for the Trace_Allocate_Entry function include the following: Device/Trace Identifier, Required_Size, Trace_Qualifiers, pEntry_Text, and Entry_Text_Length. Values for Required_Size, Trace_Qualifiers, pEntry_Text, and Entry_Text_Length are in accordance with their definition set forth above. Device/Trace identifiers include information used to identify the appropriate ITB 104 and are dependent on the allocation of the ITBs 106, e.g., by device/processor or by thread. Where the ITBs are allocated based on threads, e.g., for a multi-threaded application, a thread identifier (e.g., a locally maintained thread-id) is provided.

Where the ITBs 104 are allocated based on the device/processor, e.g., for a multi-threaded driver, the device number being processed is provided when invoked by an interrupt handler and the processor number is provided otherwise. More specifically, if invoked from an interrupt handler, the ITB 104 corresponding to the indicated device number is used. Note that exclusive access to the ITB 104 is achieved because only one instance of the interrupt handler for a given device may execute simultaneously. If not invoked from an interrupt handler, Trace_Allocate_Entry procures access by raising the interrupt-request-lever (IRQL) of the processor executing the function and calls the operating system to determine the function executing processor. Raising the IRQL ensures the executing thread does not yield the processor to another thread until the IRQL is lowered. The ITB 104 corresponding to the current processor is then used.

Using the identified ITB 104, Allocate_Trace_Entry allocates a Trace_Entry from Trace_Data at the location indicated by Next_Entry_Offset for the identified ITB 104. As discussed above, the Required_Size is rounded up to facilitate data alignment. In an exemplary embodiment, entries do not wrap around the end of Trace_Data and the entry at offset zero is not allocated (e.g., allocation starts at the offset equal to the entry rounding factor). In an exemplary embodiment, if the entry does not fit without wrapping around, the current end of Trace_Data is left unused and the entry is allocated at the beginning of Trace_Data.

In an exemplary embodiment, the Trace_Entry is initialized to ensure that it is properly allocated for use with the TGM 108 and the TAM 114. Initialization of the trace entry includes setting the Allocated_Flag, resetting the Completed_Flag, setting the Entry_Length, setting the Previous_Entry_Offset, setting the Timestamp, and setting the Trace_Qualifiers.

An exemplary process for allocating the Trace_Entry in a multi-threaded device implementation is summarized in TABLE 1.

TABLE 1

| | |
|---|---|
| 1. | If executing from an interrupt handler: |
| 2. | Use ITB at TCI.Trace_Buffer_Ptrs [max_processor + Device_Number]. |
| 3. | Else: |
| 4. | Raise IRQL of executing processor. |
| 5. | Determine current processor number. |
| 6. | Use ITB at TCI.Trace_Buffer_Ptrs [current processor number] |
| 7. | Allocate Trace_Entry of required size. |
| 8. | Update ITB.Next_Entry_Offset and ITB.Last_Entry_Offset. |
| 9. | Initialize the newly allocated entry: |
| 10. | Set Allocated flag. |
| 11. | Reset Completed flag. |
| 12. | Set Entry_Length. |
| 13. | Set Previous_Entry_Offset. |
| 14. | Clear the "new" next Trace_Entry by resetting all of its flag fields. |
| 15. | Return IRQL to original value (if not executing from interrupt handler). |
| 16. | Set Timestamp. |
| 17. | Set Trace_Qualifiers. |

At block 508, a trace entry is added to the allocated Trace_Entry. In an exemplary embodiment, the TGM 108 performs a trace entry add function (referred to herein as Trace_Add_Entry) to add a trace entry to the allocated Trace_Entry. Trace_Add_Entry may be an application program interface (API) provided to the TSM 102 to record a trace entry during execution of the TSM 102. Trace_Add_Entry may be invoked/called directly by the TSM 102 or indirectly by the TSM 102 through the use of one or more macros within the TGM 108 (described in detail below) that, in turn, invoke/call Trace_Add_Entry.

Exemplary inputs for Trace_Add_Entry include the following: Required_Size; values for Trace_Qualifiers, pEntry_Text, and Entry_Text_Length; and Data_Item_Array. Required_Size is the required size (in bytes) of Trace_Entry. Trace_Qualifiers, pEntry_Text, and Entry_Text_Length are described above. Data_Item_Array is an array of entries describing each included Data_Item_Entry. For each included Data_Item_Entry (note—zero data items may be specified), Data_Item_Array includes Value_Length, Data_Type, and pData_Value. A data item Value_Length of negative one (−1) may be used to identify the end of the Data_Item_Entry(s). In an exemplary embodiment, standard C programming language variable-argument list capabilities are used to pass the Data_Item_Array. Alternatively, a pointer to the Data_Item_Array and a separate input to indicate the number of items in the array may be provided.

An exemplary process for adding diagnostic information using Trace_Add_Entry is summarized in TABLE 2.

TABLE 2

| | | |
|---|---|---|
| 1. | | Invoke Trace_Allocate_Entry to allocate and initialize a Trace_Entry of Required_Size, and to provide Trace_Qualifiers and other arguments. |
| 2. | | Initialize a pointer to the Trace_Entry's first Data_Item_Entry. |
| 3. | | For Data_Item_Array entry: |
| | a. | If Value_Length is negative one, no further array entries are indicated and processing of the Data_Item_Array terminates. |
| | b. | Store the data item's Value_Length and Data_Type in the Trace_Entry.Data_Item_Entry currently being pointed to. |
| | c. | Store the data item's value in the current Data_Item_Entry (note - data is moved from pData_Value into Trace_Entry). |
| | d. | Update the current Data_Item_Entry pointer based on the data item's Value_Length. |
| 4. | | Turn on the Trace_Entry's Completed Flag. |

The TGM 108 may include macros for accessing its functions (which are described above with reference to blocks 504, 506, and 508) to facilitate allocating, adding, and maintaining diagnostic logic in the TSM 102. The macros may be implemented in the C programming language as set forth below. To accommodate traces having variable numbers of data-items, the macros are defined in the general form "TRACE<n>" where <n> represents the number of data items for a particular trace. An exemplary macro for a trace with no variables, i.e., TRACE0, is set forth in TABLE 3.

TABLE 3

| | |
|---|---|
| 1. | #define TRACE0(_trace_entry_type,_text)\ |
| 2. | Trace_Add_Entry\ |
| 3. | (    sizeof (Trace_Entry),\ |
| 4. | _trace_entry_type,\ |
| 5. | _text "\00",\ |
| 6. | sizeof(_text)+1,\ |
| 7. | −1    ) |

Inputs for Trace_Add_Entry are generated by the macro in TABLE 3 as follows: Required_Size is set to the size of the Trace_Entry data structure because there are no data items; Trace_Qualifiers is set to the trace-entry-type qualifier; pEntry_Text is set to _text plus a null character representing a string terminator; Entry_Text_Length is set using the C language "sizeof" expression for Trace_Entry with a one added to account for the null character; and Data_Item_Array is set to negative one to indicate the end of the argument list. An exemplary use of TRACE0 within a TSM 102 to form a diagnostic gathering instruction as discussed above with reference to block 502 is TRACE0(ERROR, "Insufficient memory to initialize").

An exemplary macro for a trace with one data item (d1) is shown in TABLE 4.

TABLE 4

| | |
|---|---|
| 1. | #define TRACE1(_trace_entry_type,_text,_d1_type,d1)\ |
| 2. | Trace_Add_Entry\ |
| 3. | ((    sizeof(Trace_Entry) + \ |
| 4. | TRACE_PARAM_ENTRY_SIZE (sizeof(_d1))),\ |
| 5. | _trace_entry_type,\ |
| 6. | _text "\00"#_d1 "\00",\ |
| 7. | sizeof(_text#_d1)+2,\ |
| 8. | sizeof(_d1),\ |
| 9. | _d1_type,\ |
| 10. | &(_d1),\ |
| 11. | −1    ) |

The rounded size of the data item is added to the size of Trace_Entry to generate Required_Size. TRACE_PARAM_ENTRY_SIZE is a macro that determines the rounded size. The C language stringizing operator (#) generates the text of the actual data-item name. The Data_Item_Array fields are generated as follows: Data_Item_Value_Length is set to the "size" of the data-item using the sizeof function; Data_Item_Type is set as provided by the macro; and pData_Item_Value is set to a pointer to the data-item using the address-of operator (&). An exemplary use of TRACE1 within the TSM 102 to form a diagnostic gathering instruction as discussed above with reference to block 502 is TRACE1(ERROR, "Insufficient memory to initialize", UINT, required_memory_size).

An exemplary format for macros for traces with two or more data items (data_item_1-n) is shown in TABLE 5.

TABLE 5

```
1.   #define TRACE<n >(_trace_entry_type,_text,
2.                   <data_item_1_type>,<data_item_1>,\
3.                   <data_item_2_type>,<data_item_2>,\
4.                   ...
5.                   <data_item_n_type>,<data_item_n>)\
6.        Trace_Add_Entry\
7.        ((     sizeof(Trace_Entry) + \
8.               TRACE_PARAM_ENTRY_SIZE
                  (sizeof(data_item_1))),\
9.               TRACE_PARAM_ENTRY_SIZE
                  (sizeof(data_item_2))),\
10.              ...
11.              TRACE_PARAM_ENTRY_SIZE
                  (sizeof(data_item_n))),\
12.              _trace_entry_type,\
13.              _text "\00"#<data_item_1> "\00",
                 #<data_item_2>"\00", . . . ,
14.                 #<data_item_n> "\00",\
15.              sizeof(_text#<data_item_1>,#<data_item_2>, ,
16.                    #<data_item_n> )+<n>+1,\
17.              sizeof(<data_item 1>),\
18.              <data_item_1_type>,\
19.              &(<data_item_1),\
20.              sizeof(<data_item 2>),\
21.              <data_item_2_type>,\
22.              &(<data_item_2),\
23.              ...
24.              sizeof(<data_item_n>),\
25.              <data_item_n_type>,\
26.              &(<data_item_n),\
27.              -1     )
```

An exemplary use of TRACE<n> within the TSM 102 to form a diagnostic gathering instruction as discussed above with reference to block 502 is TRACE<n>(ERROR, "Desired Text", data_item_type_1, data_item_1, data_item_type_2, data_item_2, data_item_type_n, data_item_n), where n is the number of data items.

At block 510, the THM 110 retrieves the TCI 106. In an exemplary embodiment, the THM 110 retrieves the TCI 106 by performing a retrieve trace control information function (referred to herein as "Get_Trace_Control_Info"). An exemplary Get_Trace_Control_Info function is set forth in TABLE 6.

TABLE 6

```
1.   void    Get Trace_Control_Info
2.           (    char*           Buffer,
3.                unsigned int    Buffer_Length,
4.                unsigned int*   TCI_Length).
```

Input arguments Buffer and Buffer_Length in Get_Trace_Control_Info indicate the buffer, e.g., CTB 112, to receive a copy of the TCI and the length of that buffer. Output argument TCI_Length indicates the length of the TCI 106. In an exemplary embodiment, if Buffer_Length is not large enough to hold a copy of the TCI 106, Get_Trace_Control_Info returns TCI_Length without copying the TCI content and the THM 110 is responsible for performing Get_Trace_Control_Info again with an adequately sized buffer.

At block 512, the THM 110 retrieves the ITB 104 and stores diagnostic information from the ITB 104 in the CTB 112. In an exemplary embodiment, the THM also retrieves text strings referenced by the ITB 104. The THM 110 may retrieve the ITB 104 by performing a retrieve trace buffer function (referred to herein as "Get_Trace_Buffer") and may retrieve the text strings referenced by the ITB 104 by performing a retrieve ITB text function (referred to herein as Get_ITB_Text). An exemplary Get_Trace_Buffer function is set forth in TABLE 7.

TABLE 7

```
1.   void    Get Trace_Buffer
2.           (    unsigned int    ITB_Id,
3.                char*           Buffer,
4.                unsigned int    Buffer_Length,
5.                unsigned int*   ITB_Length).
```

ITB_Id indicates the desired ITB (e.g., as an index within the TCI.Trace_Buffer_Ptrs array). Input arguments Buffer and Buffer_Length in Get_Trace_Buffer indicate the buffer, e.g., CTB 112 to receive a copy of the ITB 104 and the length of that buffer. Output argument ITB_Length indicates the length of the ITB 104. In an exemplary embodiment, if Buffer_Length is not large enough to hold a copy of the ITB 104, Get_Trace_Buffer returns ITB_Length without copying the ITB content and the THM 110 is responsible for performing Get_Trace_Buffer again with an adequately sized buffer.

An exemplary Get_ITB_Text function returns a copy of a null-terminated text string referenced from within an ITB and is set forth in TABLE 8.

TABLE 8

```
1.   void    Get ITB_Text
2.           (    char*           Source,
3.                char*           Buffer,
4.                unsigned int    Buffer_Length,
5.                unsigned int*   Text_Length).
```

Input argument Source indicates the location of the desired text string. Input arguments Buffer and Buffer_Length within Get_ITB_Text indicate the buffer, e.g., CTB 112, to receive a copy of the text string and the length of that buffer. In an exemplary embodiment, if Buffer_Length is not large enough to hold a copy of the text string, Get_ITB_Text returns Text_Length without copying the text string content and the THM 110 is responsible for performing Get_Trace_Buffer again with an adequately sized buffer.

When executing on a live system, the THM 110 may retrieve ITBs 104 while they are being updated (i.e., new entries may be added while the ITB is being retrieved). Although the probability that an entry is added while the ITB is being retrieved is small, it may occur. The Trace_Entry Allocated and Completed flags are used to handle such a situation. Without enforcing the restriction that no ITB update is allowed during the retrieval, there still exists the possibility that information retrieved from the beginning of an ITB is inconsistent with the Trace_Data area at or just beyond the location indicated by the offset fields. For example, if Trace_Entry(s) are added to the Trace_Data area after the Next_Entry_Offset and the Last_Entry_Offset are gathered, but before the entire ITB is gathered, these most-recent Trace_Entry(s) within the ITB will be inconsistent with the indicated offsets. These most-recent entries (i.e., those allocated after the ITB offset fields were gathered) will overlay the least-recent Trace_Entry(s) within the ITB and, thus, the impact is minimal. Further, this issue is irrelevant for "post mortem" analysis and for text string copy operations, which have a constant value.

At block 514, the TAM 114 analyzes the diagnostic information in the CTB 112 for presentation, e.g., via a display (not shown). In an exemplary embodiment, the TAM 114 is configured to perform various functions such as searching for specific trace entries or data values. The TAM 114 may be implemented as a graphical user interface (GUI).

In an exemplary embodiment, the TAM 114 employs an ITB scanning algorithm to parse through the ITB in the CTB 112 to organize the individual ITB trace entries by time of generation (e.g., from newest to oldest). For a single ITB, entries are scanned by starting at the ITB's Last_Entry_Offset value and working backwards. For multiple ITBs, the scanning algorithm maintains the following data items for each ITB: scan_offset, wrap_around, tb_completed, string_ptr. As ITB entries are processed, scan_offset tracks the current scan location in the ITB and identifies the most recent entry in the ITB that has not been processed. Wrap_around is a Boolean indicator indicating whether the physical end of the ITB has been passed. Because entries are processed in time order, this item is used to determine whether all ITB entries have been processed. Tb_completed is a Boolean indicator indicating all entries in the ITB have been processed. String_ptr points to the next string, within the corresponding CTB.ITB_String area, reference by an ITB entry.

The scanning algorithm performs an initial scan of each ITB to initialize the ITB based items. If the corresponding Trace_Buffer_Ptrs within the TCI indicate that no ITB exists, tb_completed is set to true and no other values are relevant. If an ITB exists, wrap_around is set to false, tb_completed is set to false, scan_offset is set to ITB.Last_Entry_Offset, and string_ptr is set to the start of the CTB.ITB_String area. The scanning algorithm then performs the logic loop set forth in TABLE 9.

TABLE 9

| 1. | For each ITB //to identify the most-recent entry |
| 2. | Newest_ITB = null;//the ITB containing the most-recent entry |
| 3. | Newest_Entry =0//offset, within Newest_ITB, of the most-recent entry |
| 4. | For <all ITBs> |
| 5. | If (tb_completed) |
| 6. | Continue to next ITB |
| 7. | If (Newest_ITB==null)//first entry of scan |
| 8. | OR |
| 9. | (<this entry is newer than Newest_Time>) |
| 10. | Assign Newest_ITB, Newest_Entry, Newest_Time |
| 11. | to reference the entry being scanned |

TABLE 9-continued

| 12. | (scan_offset) |
| 13. | Continue to next ITB |
| 14. | If no most-recent ITB, EXIT |
| 15. | Else, format and/or process most recent entry |
| 16. | Update local data items for the ITB containing the trace entry |
| 17. | Repeat |

As the entry is processed at line 15 in TABLE 9, each text string referenced in the entry can be found at string_ptr, which, in turn, is updated to advance past the text string. Thus, string_ptr points to the next reference string, which may be reference in the same ITB Trace_Entry or in a succeeding Trace_Entry.

Local data items for the ITB containing the Trace_Entry processed at line 16 in TABLE 9 may be updated in accordance with the instructions in TABLE 10.

TABLE 10

| 1. | if(wrap_around==false) |
| 2. | if(newest entry's Previous_Entry_Offset==0 |
| 3. | //offset zero is reserved - this indicates that allocation of |
| 4. | //entries in this ITB has never wrapped around. |
| 5. | tb_completed=true;// no entries left |
| 6. | else |
| 7. | if(newest entry's Previous_Entry_Offset>scan_offset) |
| 8. | wrap_around=true; |
| 9. | if(wrap_around==true) |
| 10. | if(newest entry's Previous_Entry_Offset<=ITB.Next_Entry_Offset) |
| 11. | //this indicates that the allocation of entries wrapped around |
| 12. | //both the physical end of the ITB and the logical start of the |
| 13. | //newest entry |
| 14. | tb_completed=TRUE; |
| 15. | scan_offset=newest entry's Previous_Entry_Offset. |

An exemplary output of the TAM 114 for presentation is set forth in TABLE 11 followed by an exemplary macro set forth in TABLE 12 for use in the TGM 108 to generate the diagnostic information for display by the TAM 114. For illustrative purposes, the exemplary output illustrates the exemplary macro executed using two unique threads.

TABLE 11

| # | Timestamp | Thread | Proc | Type | Trace-Text | Params/values |
|---|---|---|---|---|---|---|
| 64 | 13:27:01.076.023 | 221 | 0 | Error | Insufficient memory to initialize | |
| 65 | 13:27:01.006.549 | 221 | 0 | Normal | Configuration info | Location_Code = 0x000000976 |
| | Account Number = 0x00047890 Employee_Flag = 0x00 Trans_File_Ptr = 01115FD8 | | | | | |
| 66 | 13:27:00.602.772 | 221 | 0 | Normal | Sample Application thread initialize | Max_Id = 0x00002000 |
| | Required_Table_Entries = 0x00001000 | | | | | |
| 67 | 13:26:58.702.841 | 1A4 | 0 | Normal | Table entries allocated | File_Id = 0x00000001 |
| | Table_Ptr = 01116400 | | | | | |
| 68 | 13:26:58.533.290 | 1A4 | 0 | Normal | Configuration Info | Location_Code = 0x000000407 |
| | Account_Number = 0x00056920 Employee_Flag = 0x00 Trans_File_Ptr = 01115FD8 | | | | | |
| 69 | 13:26:57.119.402 | 1A4 | 0 | Normal | Sample Application thread initialize | Max_Id = 0x00002000 |
| | Required_Table_Entries = 0x00008000 | | | | | |

As illustrated in TABLE 11, the trace entries may be ordered in time from the most current to the least current.

TABLE 12

| | |
|---|---|
| 1. | TRACE2(NORMAL, "Sample application thread initializing", |
| 2. | NUMERIC, Max_Id, |
| 3. | NUMERIC, Required_Table_Entries); |
| 4. | ... |
| 5. | TRACE4(NORMAL, "Configurations info", |
| 6. | NUMERIC, Location_Code, |
| 7. | NUMERIC, Account_Number, |
| 8. | BOOLEAN, Employee_Flag, |
| 9. | PVOID, Trans_File_Ptr); |
| 10. | ... |
| 11. | if(<memory allocate failed>) |
| 12. | {TRACE0 (ERROR, "Insufficient memory to initialize"); |
| 13. | ... |
| 14. | } |
| 15. | else |
| 16. | {TRACE2 (NORMAL, "Table entries allocated", |
| 17. | NUMERIC, File_Id, |
| 18. | PVOID, Table_Ptr); |
| 19. | ... |
| 19. | } |

In an exemplary embodiment, the THM 110 is responsible for gathering ITBs 104 into a format usable by the TAM 114. Accordingly, the THM should have access to the TCI 106 and all ITBs 104. In an exemplary embodiment, access is accomplished via standard input/output control (IOCTL) methods for the multi-threaded drivers and via standard inter-processor communication (IPC) methods for the multi-threaded applications.

In an exemplary embodiment, the THM 110 gathers the diagnostic information by first invoking Get_Trace_Control_Info (as discussed above with reference to block 510) and then repeated calls to Get_Trace_Buffer for each ITB (as discussed above with reference to block 512). The THM 110 stores the gathered diagnostic information in a file as CTB 112. The THM 110 then scans each ITB 104 in order to detect and copy (e.g., via Get_ITB_Text) all text strings referenced within the ITB into the corresponding CTB. ITB_String. To allow the TAM 114 to associate the appropriate text strings with the ITB entries, the THM 110 may use the ITB scanning algorithm to place items into the ITB_String in time reference order. Storing pointers to text strings in the ITB rather than storing the text strings themselves improves performance by avoiding the movement of strings of text, which is computationally expensive. In addition, the use of pointers permits the use of longer and, thus, more descriptive text stings than are traditionally used in software diagnostic architectures without adversely affecting performance.

Test results are now provided for a sample application. These results depict percentage of processing overhead attributable to diagnostic gathering as compared to the same application with no diagnostic gathering enabled. The sample application was subjected to the following conditions: no optimization, partial optimization, and full optimization. The no optimization condition includes a version of the sample application in which a single trace buffer is used and text pointer are not employed. The use of a single trace buffer in a multi-processor environment results in one or more processors executing an instruction to make an entry to the buffer being idle until a current processor releases the buffer. The partial optimization condition includes a version of the sample application in which a single trace buffer is used and text pointers are employed. The full optimization condition includes a version of the application including text pointers and multiple ITBs, which allows simultaneous buffer access to more than one processor within a multi-processor environment. The sample application is a multi-threaded application. The number of threads employed by the application is an "execution-time" variable for evaluating the impact of multiple threads at various levels of potential contention. Testing is first presented for a two processor system. The test results, which are depicted in TABLE 13, illustrate percentage of processing overhead attributable to diagnostic gathering for each version of the application.

TABLE 13

| | Number of Threads | | | |
|---|---|---|---|---|
| | Application | | | |
| Variant | 1 | 2 | 4 | 8 |
| No Optimization | 4.97% | 13.04% | 12.90% | 13.53% |
| Partial Optimization | 2.75% | 11.00% | 11.30% | 10.97% |
| Full Optimization | 2.07% | 2.07% | 2.19% | 2.11% |

The single thread test case illustrates the impact of the present invention on performance aspects that are unrelated to multiple trace buffer usage. The single thread test case further illustrates that overhead for the partial optimization condition was reduced by more than 40 percent in comparison to the no optimization condition. The full optimization condition introduces a small amount of incremental improvement. Significant improvement, however, is not expected because the single thread case would not involve resource contention.

The multiple threaded test cases show that reduction in the partial optimization variant is fairly consistent with the single thread test case, which is expected because each of the multiple threads executes the same logic. The full optimization condition, however, accounts for a very significant overhead reduction in each of the multiple thread test cases with processor overhead reduced by a factor of more than 5 times. In addition to the basic diagnostic resource contention for tracing among multiple threads, overhead in the no optimization condition is significant. It is contemplated that the significant increase in overhead is due to processor memory cache conflicts. In the two processor system, increasing the number of threads above the number of processors has little impact because only two threads are able to execute concurrently.

Testing is now presented for an eight processor system. The test results, which are depicted in TABLE 14, illustrate percentage of processing overhead attributable to diagnostic gathering for each version of the sample application.

TABLE 14

| | Number of Threads | | |
|---|---|---|---|
| | Application | | |
| Variant | 1 | 4 | 8 |
| No Optimization | 12.64% | 272.90% | 705.38% |
| Partial Optimization | 5.77% | 269.38% | 659.95% |
| Full Optimization | 5.77% | 5.42% | 5.11% |

As shown for the eight processor test results, tracing overhead increases quickly with the number of threads. The significant overhead in both the no optimization condition and the partial optimization condition may prohibit deployment of a highly-parallel application with diagnostic capabilities that is performance efficient. The full optimization condition, however, introduces minimal overhead and allows additional parallelism with relatively low incremental diagnostics overhead.

The invention may be implemented in software on a computer (not shown). In this embodiment, one or more of the functions of the various components may be implemented in software that controls the computer. This software may be embodied in a computer readable carrier, for example, a magnetic or optical disk, a memory-card or an audio frequency, radio-frequency, or optical carrier wave.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method to diagnose software including diagnostic gathering instructions, wherein the software controls a multi-threaded device driver associated with a plurality of system processors and an interrupt handler, the method comprising the steps of:
    allocating an individual trace buffer for each instance of the interrupt handler and for each system processor when not executing within an instance of the interrupt handler to form a plurality of individual trace buffers;
    storing diagnostic information to the plurality of individual trace buffers responsive to the diagnostic gathering instructions;
    consolidating the diagnostic information from the plurality of individual trace buffers to a consolidated trace buffer; and
    presenting at least a portion of the consolidated diagnostic information.

2. The method of claim 1, wherein the software is a multi-threaded application and wherein the method further comprises the step of:
    allocating an individual trace buffer for each thread of the multi-threaded application.

3. The method of claim 1, further comprising the step of:
    allocating a trace control information data structure, the trace control information data structure storing information related to the plurality of individual trace buffers.

4. The method of claim 3, wherein the consolidating step comprises the steps of:
    retrieving the trace control information data structure;
    retrieving diagnostic information from each of the plurality of individual trace buffers in the consolidated trace buffer; and
    retrieving text strings referenced by each of the plurality of individual trace buffers.

5. The method of claim 1, wherein the presenting step comprises the step of:
    processing the consolidated trace entries; and
    presenting the processed consolidated trace entries.

6. The method of claim 1, wherein at least one of the diagnostic gathering instructions includes a variable identifier associated with a data item and wherein the method further comprises the step of:
    processing the variable identifier to generate text describing the data item.

7. An apparatus to diagnose software including diagnostic gathering instructions, wherein the software controls a multi-threaded device driver associated with a plurality of system processors and an interrupt handler, the apparatus comprising:
    a plurality of individual trace buffers configured to store diagnostic information associated with the diagnostic gathering instructions, wherein an individual trace buffer is allocated for each instance of the interrupt handler and for each system processor when not executing within an instance of the interrupt handler to form the plurality of individual trace buffers; and
    a consolidated trace buffer configured to store copies of the plurality of individual trace buffers.

8. The apparatus of claim 7, further comprising:
    a trace control information data structure configured to store information associated with each of the plurality of individual trace buffers;
    wherein the consolidated trace buffer is further configured to store a copy of the trace control information data structure.

9. The apparatus of claim 7, further comprising:
    a trace generation module configured to allocate individual trace buffers responsive to the diagnostic gathering instructions and store the diagnostic information to the allocated individual trace buffers.

10. The apparatus of claim 7, further comprising:
    a trace harvest module configured to store a copy of the individual trace buffers to the consolidated trace buffer.

11. The apparatus of claim 10, wherein the trace analysis module is further configured to order the diagnostic information in time.

12. The apparatus of claim 7, further comprising:
    a trace analysis module configured to process the diagnostic information in the consolidated trace buffer.

13. The apparatus of claim 7, wherein the plurality of individual trace buffers are further configured to store diagnostic information including variable length text strings.

14. The apparatus of claim 7, wherein the diagnostic information includes one or more trace entries and wherein the plurality of individual trace buffers are further configured to store a variable number of data items in each trace entry.

15. A computer readable storage medium including diagnostic software that is configured to control a computer to implement a software diagnostic processing method to diagnose software including diagnostic gathering instructions, wherein the software controls a multi-threaded device driver associated with a plurality of system processors and an interrupt handler, the processing method including the steps of:
    allocating an individual trace buffer for each instance of the interrupt handler and for each system processor when not executing within an instance of the interrupt handler to form a plurality of individual trace buffers;
    storing diagnostic information to a plurality of individual trace buffers responsive to the diagnostic gathering instructions;
    consolidating the diagnostic information from the plurality of individual trace buffers to a consolidated trace buffer; and
    presenting at least a portion of the consolidated diagnostic information.

16. The computer readable storage medium of claim 15, wherein the software is a multi-threaded application and wherein the method implemented by the computer further comprises the step of:
    allocating an individual trace buffer for each thread of the multi-threaded application.

17. The computer readable storage medium of claim 15, wherein the processing method implemented by the computer further comprises the step of:

allocating a trace control information data structure, the trace control information data structure storing information related to the plurality of individual trace buffers.

18. The computer readable storage medium of claim 17, wherein the consolidating step for implementation by the computer comprises the steps of:

retrieving the trace control information data structure;

retrieving diagnostic information from each of the plurality of individual trace buffers in the consolidated trace buffer; and retrieving text strings referenced by each of the plurality of individual trace buffers.

19. The computer readable storage medium of claim 15, wherein the presenting step for implementation by the computer comprises the step of:

processing the consolidated trace entries; and presenting the processed consolidated trace entries.

20. The computer readable storage medium of claim 15, wherein at least one of the diagnostic gathering instructions includes a variable identifier associated with a data item and wherein the method implemented by the computer further comprises the step of:

processing the variable identifier to generate text describing the data item.

* * * * *